US012584730B2

(12) United States Patent
Torrione

(10) Patent No.: US 12,584,730 B2
(45) Date of Patent: Mar. 24, 2026

(54) OIL RIG DRILL PIPE AND TUBING TALLY SYSTEM

(71) Applicant: HELMERICH & PAYNE TECHNOLOGIES, LLC, Tulsa, OK (US)

(72) Inventor: Peter A. Torrione, Durham, NC (US)

(73) Assignee: HELMERICH & PAYNE TECHNOLOGIES, LLC, Tulsa, OK (US)

( * ) Notice: Subject to any disclaimer, the term of this patent is extended or adjusted under 35 U.S.C. 154(b) by 0 days.

(21) Appl. No.: 18/612,696

(22) Filed: Mar. 21, 2024

(65) Prior Publication Data

US 2024/0230317 A1     Jul. 11, 2024

Related U.S. Application Data

(63) Continuation of application No. 18/159,672, filed on Jan. 25, 2023, now Pat. No. 11,971,247, which is a
(Continued)

(51) Int. Cl.
*G01B 11/08*     (2006.01)
*E21B 17/00*     (2006.01)
(Continued)

(52) U.S. Cl.
CPC ............ *G01B 11/08* (2013.01); *E21B 17/006* (2013.01); *E21B 19/06* (2013.01); *E21B 19/20* (2013.01);
(Continued)

(58) Field of Classification Search
CPC ....... G01B 11/08; G01B 11/02; G01B 11/022; E21B 17/006; E21B 19/06; E21B 19/20;
(Continued)

(56) References Cited

U.S. PATENT DOCUMENTS 4,610,005 A     9/1986  Utasi
6,469,734 B1    10/2002  Nichani et al.
(Continued)

FOREIGN PATENT DOCUMENTS

WO     2016147045 A1     9/2016
WO     2017042677 A1     3/2017
(Continued)

OTHER PUBLICATIONS

U.S. Appl. No. 14/939,089 , "Final Office Action", May 5, 2017 1 pages.
(Continued)

*Primary Examiner* — Farzana Hossain
(74) *Attorney, Agent, or Firm* — Kilpatrick Townsend & Stockton LLP

(57)     ABSTRACT

Disclosed embodiments relate to systems and methods for locating, measuring, counting or aiding in the handling of drill pipes 106. The system 100 comprises at least one camera 102 capable of gathering visual data 150 regarding detecting, localizing or both, pipes 106, roughnecks 116, elevators 118 and combinations thereof. The system 100 further comprises a processor 110 and a logging system 114 for recording the gathered visual data 150. The method 200 comprises acquiring visual data 150 using a camera 106, analyzing the acquired data 150, and recording the acquired data 150.

18 Claims, 3 Drawing Sheets

Related U.S. Application Data continuation of application No. 17/192,735, filed on Mar. 4, 2021, now Pat. No. 11,592,282, which is a continuation of application No. 16/502,689, filed on Jul. 3, 2019, now Pat. No. 10,982,950, which is a continuation of application No. 14/939,089, filed on Nov. 12, 2015, now Pat. No. 11,378,387.

(60) Provisional application No. 62/078,577, filed on Nov. 12, 2014.

(51) Int. Cl.

| | |
|---|---|
| *E21B 19/06* | (2006.01) |
| *E21B 19/20* | (2006.01) |
| *E21B 41/00* | (2006.01) |
| *E21B 44/00* | (2006.01) |
| *E21B 47/04* | (2012.01) |
| *G01B 11/02* | (2006.01) |
| *G06T 7/00* | (2017.01) |
| *G08B 21/18* | (2006.01) |

(52) U.S. Cl.
CPC .............. *E21B 41/00* (2013.01); *E21B 44/00* (2013.01); *E21B 47/04* (2013.01); *G01B 11/02* (2013.01); *G01B 11/022* (2013.01); *G06T 7/0004* (2013.01); *G08B 21/182* (2013.01); *G08B 21/187* (2013.01); *G06T 2207/30108* (2013.01)

(58) Field of Classification Search
CPC .......... E21B 41/00; E21B 44/00; E21B 47/04; G06T 7/0004; G06T 2207/30108; G08B 21/182; G08B 21/187
See application file for complete search history.

(56) References Cited

U.S. PATENT DOCUMENTS

| | | | |
|---|---|---|---|
| 7,874,351 | B2 | 1/2011 | Hampton et al. |
| 7,933,166 | B2 | 4/2011 | Goodman |
| 8,218,826 | B2 | 7/2012 | Ciglenec et al. |
| 8,233,667 | B2 | 7/2012 | Helgason et al. |
| 8,363,101 | B2 | 1/2013 | Gschwendtner et al. |
| 8,395,661 | B1 | 3/2013 | Olsson et al. |
| 8,547,428 | B1 | 10/2013 | Olsson et al. |
| 8,622,128 | B2 | 1/2014 | Hegeman |
| 8,812,236 | B1 | 8/2014 | Freeman et al. |
| 8,873,806 | B2 | 10/2014 | Kiest, Jr. |
| 9,041,794 | B1 | 5/2015 | Olsson et al. |
| 9,134,255 | B1 | 9/2015 | Olsson et al. |
| 9,279,319 | B2 | 3/2016 | Savage |
| 9,410,877 | B2 | 8/2016 | Maxey et al. |
| 9,464,492 | B2 | 10/2016 | Austefjord et al. |
| 9,518,817 | B2 | 12/2016 | Baba et al. |
| 9,651,468 | B2 | 5/2017 | Rowe et al. |
| 9,664,011 | B2 | 5/2017 | Kruspe et al. |
| 9,677,882 | B2 | 6/2017 | Kiest, Jr. |
| 9,706,185 | B2 | 7/2017 | Ellis |
| 9,869,145 | B2 | 1/2018 | Jones et al. |
| 9,912,918 | B2 | 3/2018 | Samuel |
| 9,915,112 | B2 | 3/2018 | Geehan et al. |
| 10,227,859 | B2 | 3/2019 | Richards et al. |
| 10,328,503 | B2 | 6/2019 | Osawa et al. |
| 10,982,950 | B2 | 4/2021 | Torrione |
| 11,378,387 | B2 | 7/2022 | Torrione |
| 11,592,282 | B2 | 2/2023 | Torrione |
| 11,906,283 | B2 | 2/2024 | Torrione |
| 11,971,247 | B2 | 4/2024 | Torrione |
| 2009/0159294 | A1 | 6/2009 | Abdollahi et al. |
| 2010/0328095 | A1 | 12/2010 | Hawthorn et al. |
| 2011/0280104 | A1 | 11/2011 | McClung, III |
| 2011/0308332 | A1 | 12/2011 | Blessum et al. |
| 2012/0123756 | A1 | 5/2012 | Wang et al. |
| 2012/0163932 | A1 | 6/2012 | Schmidt et al. |
| 2012/0188090 | A1 | 7/2012 | Wessling et al. |
| 2012/0328095 | A1 | 12/2012 | Takahashi et al. |
| 2013/0236064 | A1 | 9/2013 | Li et al. |
| 2013/0265409 | A1 | 10/2013 | Tjhang et al. |
| 2013/0275100 | A1 | 10/2013 | Ellis et al. |
| 2013/0345878 | A1 | 12/2013 | Austefjord et al. |
| 2014/0002617 | A1 | 1/2014 | Zhang et al. |
| 2014/0233804 | A1* | 8/2014 | Gustavsson ........... E21B 19/165 382/103 |
| 2014/0326505 | A1 | 11/2014 | Davis et al. |
| 2014/0333754 | A1 | 11/2014 | Graves et al. |
| 2015/0075866 | A1 | 3/2015 | Tjhang |
| 2015/0114634 | A1 | 4/2015 | Limbacher |
| 2015/0134257 | A1 | 5/2015 | Erge et al. |
| 2015/0138337 | A1* | 5/2015 | Tjhang .................... E21B 43/35 166/305.1 |
| 2015/0218936 | A1 | 8/2015 | Maher et al. |
| 2015/0345261 | A1 | 12/2015 | Kruspe et al. |
| 2016/0130889 | A1* | 5/2016 | Torrione ................ G01B 11/08 348/135 |
| 2017/0089153 | A1 | 3/2017 | Teodorescu |
| 2017/0138171 | A1* | 5/2017 | Richards ................. E21B 41/00 |
| 2017/0145807 | A1* | 5/2017 | Wendorf ................ G01V 1/226 |
| 2017/0152729 | A1 | 6/2017 | Gleitman et al. |
| 2017/0161885 | A1 | 6/2017 | Parmeshwar et al. |
| 2017/0167853 | A1 | 6/2017 | Zheng et al. |
| 2017/0284184 | A1 | 10/2017 | Anghelescu et al. |
| 2017/0322086 | A1 | 11/2017 | Luharuka et al. |
| 2018/0180524 | A1 | 6/2018 | Francois et al. |
| 2019/0100988 | A1 | 4/2019 | Ellis et al. |
| 2019/0102612 | A1 | 4/2019 | Takemoto et al. |
| 2019/0136650 | A1 | 5/2019 | Zheng et al. |
| 2019/0141294 | A1 | 5/2019 | Thorn et al. |
| 2019/0206068 | A1 | 7/2019 | Stark et al. |

FOREIGN PATENT DOCUMENTS

| | | |
|---|---|---|
| WO | 2017132297 A2 | 8/2017 |
| WO | 2017176689 A1 | 10/2017 |
| WO | 2018093273 A1 | 5/2018 |
| WO | 2018131485 A1 | 7/2018 |
| WO | 2018148832 A1 | 8/2018 |
| WO | 2018157513 A1 | 9/2018 |

OTHER PUBLICATIONS

U.S. Appl. No. 14/939,089, "Final Office Action", Jun. 15, 2021, 27 pages.

U.S. Appl. No. 14/939,089, "Non-Final Office Action", Oct. 28, 2021, 15 pages.

U.S. Appl. No. 14/939,089, "Non-Final Office Action", Oct. 6, 2016, 18 pages.

U.S. Appl. No. 14/939,089, "Non-Final Office Action", Mar. 14, 2018, 21 pages.

U.S. Appl. No. 14/939,089, "Notice of Allowance", Mar. 2, 2022, 7 pages.

U.S. Appl. No. 16/502,689, "Non-Final Office Action", Aug. 4, 2020, 25 pages.

U.S. Appl. No. 16/502,689, "Notice of Allowance", Nov. 25, 2020, 5 pages.

U.S. Appl. No. 17/192,735, "Final Office Action", Feb. 11, 2022, 38 pages.

U.S. Appl. No. 17/192,735, "Non-Final Office Action", Jul. 6, 2022, 24 pages.

U.S. Appl. No. 17/192,735, "Non-Final Office Action", Sep. 21, 2021, 36 pages.

U.S. Appl. No. 17/192,735, "Notice of Allowance", Oct. 27, 2022, 9 pages.

U.S. Appl. No. 17/805,200, "Corrected Notice of Allowability", Jan. 19, 2024, 2 pages.

U.S. Appl. No. 17/805,200, "Non-Final Office Action", May 25, 2023, 17 pages.

U.S. Appl. No. 17/805,200, "Notice of Allowance", Oct. 12, 2023, 8 pages.

(56)                    References Cited

OTHER PUBLICATIONS

U.S. Appl. No. 18/159,672 , "Corrected Notice of Allowability",
Mar. 27, 2024, 2 pages.
U.S. Appl. No. 18/159,672 , "Final Office Action", Oct. 17, 2023,
26 pages.
U.S. Appl. No. 18/159,672 , "Non-Final Office Action", Jun. 8,
2023, 52 pages.
U.S. Appl. No. 18/159,672 , "Notice of Allowance", Dec. 21, 2023,
6 pages.
CA2967797 , "Office Action", Jun. 3, 2022, 10 pages.
CA2967797 , "Office Action", Apr. 5, 2023, 6 pages.
PCT/US2015/060318 , "International Search Report and Written
Opinion", Jan. 28, 2016, 8 pages.

\* cited by examiner

OIL RIG DRILL PIPE AND TUBING TALLY SYSTEM

CROSS-REFERENCES TO RELATED APPLICATIONS

This application is a continuation of U.S. patent application Ser. No. 18/159,672, filed on Jan. 25, 2023 and entitled OIL RIG DRILL PIPE AND TUBING TALLY SYSTEM, which is a continuation of U.S. patent application Ser. No. 17/192,735, filed on Mar. 4, 2021 and entitled OIL RIG DRILL PIPE AND TUBING TALLY SYSTEM, now U.S. Pat. No. 11,592,282, which is a continuation of U.S. patent application Ser. No. 16/502,689, filed Jul. 3, 2019 and entitled OIL RIG DRILL PIPE AND TUBING TALLY SYSTEM, now U.S. Pat. No. 10,982,950, which is a continuation of U.S. patent application Ser. No. 14/939,089, filed Nov. 12, 2015 and entitled SYSTEM AND METHOD FOR LOCATING, MEASURING, COUNTING, AND AIDING IN THE HANDLING OF DRILL PIPES, now U.S. Pat. No. 11,378,387, which claims benefit of U.S. Provisional Application No. 62/078,577, filed Nov. 12, 2014 and entitled SYSTEM AND METHOD FOR LOCATING, MEASURING, COUNTING, AND AIDING IN THE HANDLING OF DRILL PIPES, all of which are hereby incorporated in their entireties by this reference.

FIELD OF THE INVENTION

Embodiments described herein relate to systems and methods for locating, measuring, counting, and aiding in the handling of drill pipes.

BACKGROUND AND SUMMARY

Modern drilling involves scores of people and multiple inter-connecting activities. Obtaining real-time information about ongoing operations is of paramount importance for safe, efficient drilling. As a result, modern rigs often have thousands of sensors actively measuring numerous parameters related to vessel operation, in addition to information about the down-hole drilling environment.

Despite the multitude of sensors on today's rigs, a significant portion of rig activities and sensing problems remain difficult to measure with classical instrumentation and person-in-the-loop sensing is often utilized in place of automated sensing.

By applying automated, computer-based video interpretation, continuous, robust, and accurate assessment of many different phenomena can be achieved through pre-existing video data without requiring a person-in-the-loop. Automated interpretation of video data is known as computer vision, and recent advances in computer vision technologies have led to significantly improved performance across a wide range of video-based sensing tasks. Computer vision can be used to improve safety, reduce costs and improve efficiency.

Handling and counting of drill pipes on a rig is typically accomplished using primarily human-in-the-loop techniques. For example, a person is responsible for maintaining an accurate log of the types, diameters and lengths of pipes entered into the well-bore as drilling progresses and responsible for counting pipes as they are removed from the well-bore. Although a relatively simple human endeavor, errors in pipe tallying can and do occur, and these errors can cause significant disruptions to drilling activities.

Classical instrumentation for pipe tallying is either time-consuming (e.g., manual measurement of each pipe) or not suitable for harsh down-well conditions (e.g., RFID tagging). In contrast, computer vision technologies can be utilized to perform many of the activities currently undertaken manually, providing significant savings in drilling time and cost and reducing the risk from pipe tally errors. These techniques provide a more accurate technique for generating pipe tallies and can significantly reduce rig down-time due to pipe tally errors; potentially saving millions of dollars per year. Therefore, there is a need for an automated computer vision based technique for measuring pipe lengths and diameters, and counting pipe segments as they enter into or are removed from the well-bore.

DETAILED DESCRIPTION OF THE INVENTION

Figure 1:
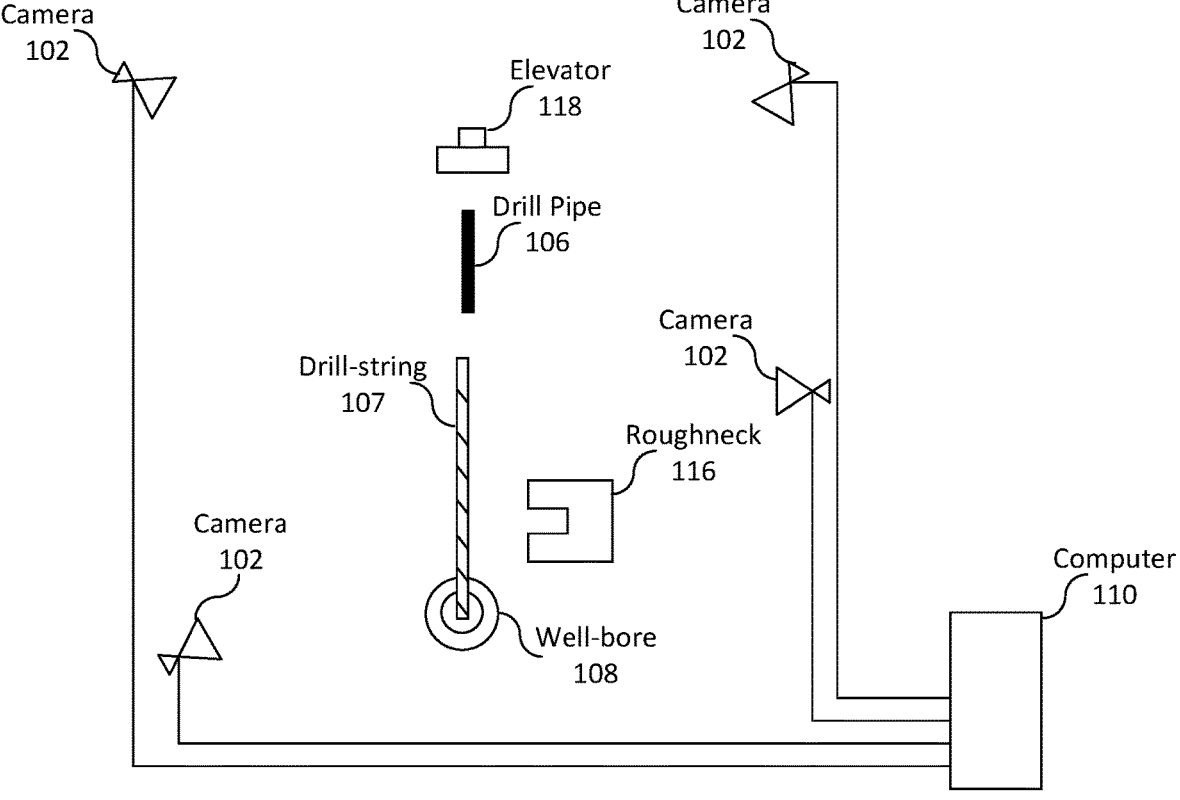
FIG. 1 depicts one of many embodiments of a system involving multiple cameras and CPUs for monitoring drilling pipe and assisting in drilling pipe handling.

The "Pipe Tally System" system, PTS, consists of several parts. In one preferred embodiment, one or more video cameras 102 positioned so as to be able to see the drilling pipe 106 as it is attached to, or removed from the drill-string 107. Depending on requirements, one camera 102 at sufficient distance from the bore-hole 108 to view the entire pipe 106 segment at once may be sufficient, otherwise two or more cameras 102 may be used, each of which may only see part of the pipe 106 as it is entered into the drill-string 107, but information or data 150 can be aggregated across the different cameras using the known camera positions and poses.

Each camera 102 may contain or be connected to a computer 110 which detects and localizes pipes 106, the iron roughneck 116, the elevator 118, or other relevant components. Different regions of interest for each object type can be defined using the known camera 102 geometry, or using user-inputs. Since the cameras 102 are at known distances from the bore-hole 108, camera transform information can be used to calculate the pipe lengths and diameters as they are tracked into and out of the well-bore 108. Information about the well-state, including the number of pipe stands and pipe segments 106 in the well may be accumulated on a central computing resource 110. In an alternative embodiment involving multiple cameras 102, pipe length, diameter, location and tracking information may be calculated by accumulating information 150 about the pipe 106 across multiple camera feeds.

Pipes 106 on a rig may be marked with paint or other marking system to make them easier to detect (e.g., a colorful stripe of paint near either end of the pipe 106 can help in detection, localization and length estimation).

In certain embodiments, the resulting information 150 about pipes 106 may be amalgamated into an automatically generated well-state report which may include a pipe tally (information about the pipe lengths and diameters, time the pipe 106 was added to or removed from the drill-string 107, or any other pipe 106 specific information). Automatic alarms 120 may be raised to the attention of the drill team (1) if at any time the automatic pipe tally does not match a manually generated pipe tally, (2) if a new piece of pipe 106 being added to the drill-string 107 is not commensurate with the current drill-string 107 (e.g., wrong pipe diameter), or (3) any other condition arises in which an alarm 120 is desired. In FIG. 1, cameras 102 are mounted around the drill-string 107, oriented to be able to see new segments of pipe 106 as they are added to the drill-string 107, or as they are removed from the drill-string 107. If the rig design allows it, one camera 102 may be sufficient. Alternatively, multiple cameras 102, each of which may only be able to see part of the pipe 106 can also be utilized. In some embodiments, cameras 102 may also be able to see well-bore 108, rough neck 116 and elevator 118. Processor 110 is connected to cameras 102 and capable of analyzing the visual data 150 gathered by the cameras 102.

Figure 2:
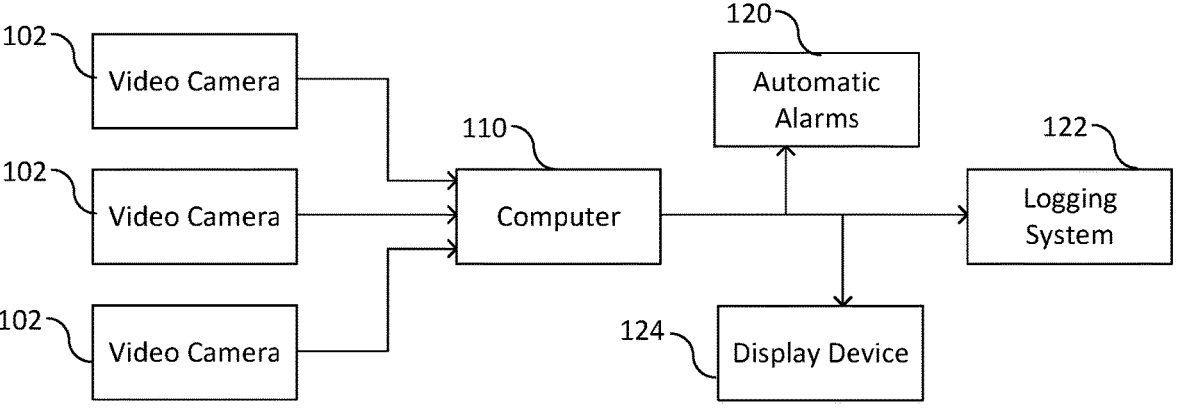
FIG. 2 depicts a potential series of steps involved in a system for monitoring drilling pipe and assisting in drilling pipe handling.

In FIG. 2, a potential configuration of the disclosed system is shown. Cameras 102 are connected to processor 110. Processor 110 may be connected to a logging system 122, an alarm 120 and/or a display device 124. It will be appreciated that many embodiments may contain greater or fewer cameras 102, processors 110 or other components than specifically shown in FIG. 2.

Figure 3:
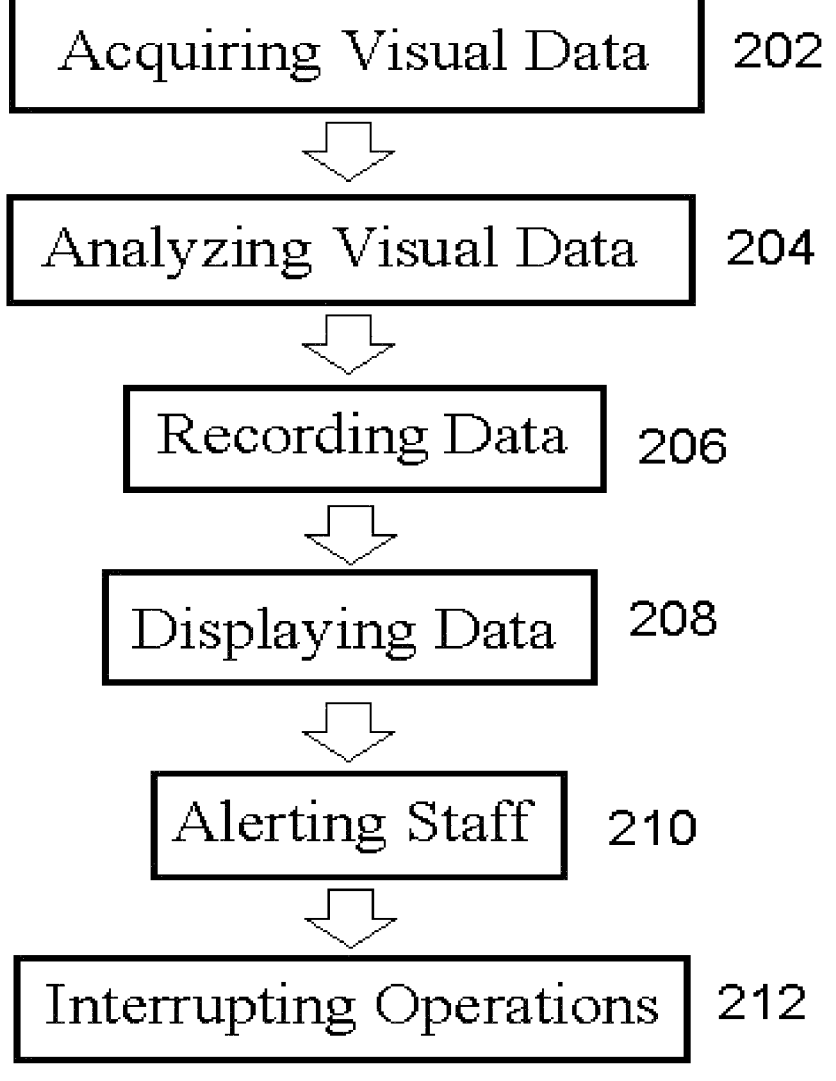
FIG. 3 depicts a potential series of steps involved in visually analyzing pipe detection.

FIG. 3 shows the steps involved in a potential method for locating, measuring, counting, and/or aiding in the handling of drill pipes. The method includes acquiring visual data 202, analyzing visual data 204, recording data 206, displaying data 208, alerting staff 210 and interrupting operations 212.

Specific regions of the scene (region of interest) may be identified during installation to specify the location of the vertical region above the well-bore 108, the location of the iron roughneck 116, or other relevant locations in each camera's 102 field of view.

During installation, the locations and poses of each camera 102 may be recorded. Camera locations can be finely estimated using standard camera calibration techniques (e.g., fiducial objects of known size and location in each camera's 102 field of view) immediately after installation, or whenever the cameras 102 have moved enough to require re-calibration.

In the case of multiple cameras 102, at least one camera 102 should be able to see the top and another camera 102 see the bottom of the pipe 106 at the same time when the pipe 106 is directly above the drill-string 107.

Pipe 106, roughneck 116 and/or elevator 118 detection may be accomplished using a combination of techniques. In an alternative embodiment, adaptive background estimation and subtraction models (e.g., adaptive Gaussian mixture models) may be applied to perform foreground and/or background segmentation. Since the background should be relatively stable over the time-frames during which each object is in-frame, adaptive background updating can be halted when a specific object is detected. This prevents the background estimation from "learning" the pipe 106 as part of the background. Furthermore, shape and size constraints can be applied to reduce false-alarms due to other non-pipe related changes in the scene. Pipes 106 used in drilling are long and narrow, and the diameters of the pipes 106 under consideration are tightly constrained. As a result, object aspect ratio and object size (given known camera 102 location relative to the drill-string 107) can be used to reduce non-pipe false alarms.

Changes in the background that are approximately the correct size and shape are then sent to a confirmation step, which takes into account features extracted from the detected regions. These features include pixel values, color histograms, and texture features, since each of these is indicative of the material composition of the object under consideration. A support vector machine trained to recognize pipe 106, roughneck 116, and/or elevator 118 like regions is then applied to the features extracted from each foreground region. The detections may be input into a finite state machine (FIG. 4).

Finite state machine logic systems may be used to ensure that the pipe tally is accurate by ensuring that the computer vision system 100 only increments the pipe tally when a suitable series of events has transpired. FIG. 4 shows a finite state machine which may be used for incrementing the pipe tally during tripping out of the hole.

In each state, state specific variables may be calculated and recorded. For example, the pipe tracker uses a combination of point-matching (using Harris features and SIFT and BRIEF descriptors) within the pipe region, as well as Lucas-Kanade optical-flow techniques to estimate the per frame velocity of the pipe 106. If the aggregate motion of the pipe 106 is "in well" (down), the pipe 106 is considered added to the drill-string 107, and this is marked in the pipe tally. If the aggregate motion of the pipe 106 is "out of well" (up), the pipe 106 is considered removed from the drill-string 107, and this is marked in the pipe tally.

Once a pipe 106 is tracked, its length and diameter may be constantly estimated and updated over time as long as the pipe 106 is in-frame. Estimation of the pipe length and diameter are possible since the aggregate change detection and pipe detection steps described above result in a bounding-box in image space containing the projection of the pipe 106 into the frame. Given the pixels comprising the pipe 106, and the camera 102 location and pose information, it is possible to measure the pipe diameter and length. These measurements are refined over time to reduce uncertainty and noise due to inter-pixel variance.

When the pipe 106 exits the scene (whether into or out of the well), the average measured pipe length and diameter may be provided to the pipe tally. For pipes 106 exiting the well, if these values do not agree with the same values measured when the pipe 106 entered the well, an alarm 120 may be raised. For pipes 106 entering the well, if these values are outside the normal bounds, or are not commensurate with the previous pipe 106 to enter the well, an alarm 120 may be raised.

Embodiments disclosed herein may relate to a system for locating, measuring, counting or aiding in the handling of drill pipes 106. The system may include at least one camera 102 which is operably connected to at least one processor 110. The camera 102 may be capable of gathering visual data 150 regarding detecting and/or localizing components of a drilling rig which may include pipes 106, drill pipes, roughnecks 116, elevators 118, drill-string components and combinations thereof. The processor 110 may be configured to analyze the visual data and may also be operably connected to the pipe elevator 118. The processor may be configured to halt elevator 118 operations when the visual data is outside of a pre-determined set of conditions. The system may also include at least one logging system 124 connected to said processor 110 for recording said visual data 150 and any analyzed data.

Certain embodiments may also include a display system 122 for displaying the collected and/or analyzed data. Embodiments may include a camera 102 which also comprises the processor 110. Embodiments of the system may also include an alarm 120 for alerting staff to the occurrence of a predetermined condition.

Disclosed embodiments may also relate to a method for locating, measuring, counting or aiding in the handling of drill pipes. The method includes acquiring visual data from at least one camera 102, analyzing said visual data 150, recording said analyzed data and disrupting the operations of a pipe elevator in response to a pre-determined condition.

Certain embodiments may also include displaying the acquired, analyzed or recorded data on a display device 122. Embodiments may also include alerting staff to any occurrence of a pre-determined condition or any measurement that falls outside of a pre-determined range using an alarm 120.

Additional embodiments relate to a system for assisting in the handling of drill pipe segments. The system may include a well-bore 108 which is being worked by a drill-string 107. The drill-string 107 may comprise a plurality of drill pipe 106 segments. The system may also contain at least one camera 102 configured to observe the addition or subtraction of drill pipe 106 segments to the drill-string 107 and gathering visual data 150. The camera 102 may be operably connected to a processor 110. The process 110 may be capable of analyzing the visual data 150.

Certain embodiments may also include a logging system 124 connected to the processor 110. Embodiments may also include a display system 122 for displaying the collected and/or analyzed data. Some embodiments may include a camera 102 which includes a processor 110. Embodiments may also contain an alarm 120 for alerting staff of the occurrence of a pre-determined condition.

What is claimed is:

1. A computer vision system for a drilling rig, the system comprising:

one or more cameras, wherein each camera has a field of view that includes a region of interest, wherein the region of interest comprises a region above a borehole of a well being drilled by a drilling rig; and a computer vision processor operably coupled to the one or more cameras, the computer vision processor configured to receive, from the one or more cameras, visual data relating to a drill pipe segment in the region of interest, and configured to provide instructions to at least one piece of equipment of the drilling rig, wherein the computer vision processor is adapted to:

analyze the visual data;

estimate a background in the field of view from the visual data;

detect an object in the field of view based on a change in the visual data;

determine whether the detected object is a pipe in the field of view based on the change in the visual data meeting a predetermined change in information;

responsive to the determination of the pipe in the field of view, halt the estimation of the background while the pipe is present in the field of view; and responsive to the determination that the change in the visual data does not meet the predetermined change in information or responsive to a determination that the pipe is not present in the field of view, update the background estimation;

generate a pipe tally report based on the detection of the object as the pipe; and interrupt operations of the at least one piece of equipment based on the visual data being outside a pre-determined set of conditions, wherein the computer vision processor is further configured to detect the object in the visual data as the pipe based on the change in the visual data meeting a predefined object aspect ratio and a predefined object size.

2. The system of claim 1, wherein the predetermined change in information comprises a change in pixel values, a change in color histograms, or a change in texture features.

3. The system of claim 1, wherein the computer vision processor is further configured to measure a length or a diameter based on the detection of the object as the pipe.

4. The system of claim 1, wherein the computer vision processor further configured to estimate a per frame velocity of the pipe.

5. The system of claim 1, wherein the pipe tally report comprises information about at least one of a pipe length, a pipe diameter, a time the pipe is added to a drill string, or a time the pipe is removed from the drill string.

6. A method comprising:

receiving, by a computer vision processor, visual data relating to a drill pipe segment in a region of interest in a field of view from one or more cameras, wherein the region of interest comprises a region above a borehole of a well being drilled by a drilling rig;

analyzing, by the computer vision processor, the visual data;

estimating, by the computer vision processor, a background in the field of view from the visual data;

detecting, by the computer vision processor, an object in the field of view based on a change in the visual data;

determining, by the computer vision processor, whether the detected object in the field of view of the visual data is a pipe based on the change in the visual data meeting a predetermined change in information;

responsive to the determination of the pipe in the field of view, halting the estimation of the background while the pipe is present in the field of view; and responsive to the determination that the change in the visual data does not meet the predetermined change in information or responsive to a determination that pipe is not present in the field of view, updating the background estimation;

generating a pipe tally report based on the detection of the object as the pipe; and interrupting operations of at least one piece of equipment based on the visual data being outside a predetermined set of conditions, wherein detecting the object in the visual data as the pipe is further based on the change in the visual data meeting a predefined object aspect ratio and a predefined object size.

7. The method of claim 6, wherein the predetermined change in information comprises a change in pixel values, a change in color histograms, or a change in texture features.

8. The method of claim 6, further comprising measuring at least one of a length or a diameter of the pipe based on the detection of the object as the pipe.

9. The method of claim 8, wherein the predetermined set of conditions is based on the measured length or diameter.

10. The method of claim 6, further comprising estimating a per frame velocity of the pipe.

11. The method of claim 6, wherein the pipe tally report comprises information about at least one of a pipe length, a pipe diameter, a time the pipe is added to a drill string, or a time the pipe is removed from the drill string.

12. The method of claim 6, further comprising generating an alert upon determining that the predetermined condition has occurred.

13. The method of claim 6, further comprising recording the visual data and displaying the recorded data on a display.

14. A non-transitory computer readable storage medium comprising a plurality of instructions executable by one or more processors, the plurality of instructions comprising instructions which, when executed by the one or more processors, cause the one or more processors to perform actions including:

acquiring visual data relating to a drill pipe segment in a region of interest in a field of view from one or more cameras, wherein the region of interest comprises a region above a borehole of a well being drilled by a drilling rig;

analyzing the visual data;

estimating a background in the field of view from the visual data;

detecting an object in the field of view based on a change in the visual data;

determining whether the detected object in the visual data is a based on the change in the visual data meeting a predetermined change in information;

responsive to the determination of the pipe in the field of view, halting the estimation of the background while the pipe is present in the field of view; and responsive to the determination that the change in the visual data does not meet the predetermined change in information or responsive to a determination that the pipe is not present in the field of view, updating the background estimation;

generating a pipe tally report based on the detection of the object as the pipe; and interrupting operations of at least one piece of equipment based on the visual data being outside a predetermined set of conditions, wherein detecting the object in the visual data as the pipe is further based on the change in the visual data meeting a predefined object aspect ratio and a predefined object size.

15. The non-transitory computer readable storage medium of claim 14, wherein the instructions further comprise instructions which, when executed on the one or more processors, cause the one or more processors to perform actions including measuring at least one of a length or a diameter of the pipe based on the detection of the object as the pipe.

16. The non-transitory computer readable storage medium of claim 14, wherein the instructions further comprise instructions which, when executed on the one or more processors, cause the one or more processors to perform actions including applying shape and size constraints to reduce false alerts to detect the object as the pipe.

17. The non-transitory computer readable storage medium of claim 14, wherein the instructions further comprise instructions which, when executed on the one or more processors, cause the one or more processors to perform actions including estimating a per frame velocity of the pipe.

18. The non-transitory computer readable storage medium of claim 14, wherein the instructions further comprise instructions which, when executed on the one or more processors, cause the one or more processors to perform actions including generating an alert upon determining that the predetermined condition has occurred.

\* \* \* \* \*